(12) United States Patent
Lenneman et al.

(10) Patent No.: US 7,957,864 B2
(45) Date of Patent: Jun. 7, 2011

(54) METHOD AND APPARATUS FOR DETECTING AND DIFFERENTIATING USERS OF A DEVICE

(75) Inventors: John K. Lenneman, Okemos, MI (US); Joseph F. Szczerba, Grand Blanc, MI (US); Roy J. Mathieu, Rochester Hills, MI (US); Thomas A. Seder, Northville, MI (US); Jan H. Aase, Oakland Township, MI (US); Alan M. Baum, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 359 days.

(21) Appl. No.: 11/768,986

(22) Filed: Jun. 27, 2007

(65) Prior Publication Data

US 2008/0004769 A1   Jan. 3, 2008

Related U.S. Application Data

(60) Provisional application No. 60/806,318, filed on Jun. 30, 2006.

(51) Int. Cl.
   G06F 7/00 (2006.01)
   G06F 19/00 (2011.01)
(52) U.S. Cl. ........................................ 701/36; 340/425.5
(58) Field of Classification Search .................. 701/36; 340/425.5; 700/86; 382/104, 181
See application file for complete search history.

(56) References Cited

U.S. PATENT DOCUMENTS

| | | | |
|---|---|---|---|
| 6,181,996 B1 * | 1/2001 | Chou et al. ...................... 701/36 |
| 6,668,221 B2 * | 12/2003 | Harter et al. ..................... 701/36 |
| 7,002,548 B2 * | 2/2006 | Yamaguchi et al. .......... 345/110 |
| 7,194,346 B2 * | 3/2007 | Griffin et al. ................... 701/45 |
| 7,239,947 B2 * | 7/2007 | Suzuki ............................ 701/36 |
| 7,508,381 B2 * | 3/2009 | Matsumura et al. .......... 345/173 |
| 2003/0120395 A1 | 6/2003 | Kacel |
| 2003/0125855 A1 * | 7/2003 | Breed et al. ..................... 701/36 |
| 2003/0220725 A1 | 11/2003 | Harter, Jr. et al. |
| 2005/0131607 A1 | 6/2005 | Breed |
| 2005/0134116 A1 | 6/2005 | Hein |
| 2005/0261815 A1 * | 11/2005 | Cowelchuk et al. ............ 701/36 |
| 2006/0030982 A1 * | 2/2006 | Szczerba et al. ................ 701/29 |
| 2006/0092130 A1 * | 5/2006 | Choquet et al. ............... 345/156 |
| 2007/0055413 A1 | 3/2007 | McCullough et al. |
| 2007/0057924 A1 | 3/2007 | Prados et al. |
| 2007/0069914 A1 * | 3/2007 | Lenneman et al. ........ 340/691.6 |
| 2007/0115205 A1 | 5/2007 | Uchiyama |
| 2007/0124041 A1 | 5/2007 | Kwon et al. |

* cited by examiner

*Primary Examiner* — Jack Keith
*Assistant Examiner* — Rami Khatib

(57) ABSTRACT

The invention provides an apparatus for operator control of an in-vehicle system. This comprises an interface device for receiving inputs for control of the in-vehicle system from the operator. There is a sensing system operative to determine a location of the operator seeking to provide the inputs to the interface device, the location consisting of one of a passenger and a driver. A controller adapts the control of the in-vehicle system based upon the location of the operator providing the inputs.

7 Claims, 3 Drawing Sheets

METHOD AND APPARATUS FOR DETECTING AND DIFFERENTIATING USERS OF A DEVICE

CROSS-REFERENCE TO RELATED APPLICATIONS

This application claims priority from U.S. Provisional Application No. 60/806,318, filed on Jun. 30, 2006, which is incorporated herein by reference.

TECHNICAL FIELD

This invention pertains generally to motor vehicles, and methods related to interactions between occupants and the vehicle.

BACKGROUND

Vehicle manufacturers and others develop and implement subsystems having control panels accessible by one or more persons in the vehicle to control various features of the subsystems. Examples of subsystems include on-board navigation systems, wireless communication services, infotainment centers, and climate/HVAC controls. Wireless communication services for mobile vehicles, such as navigation and roadside assistance, have increased rapidly in recent years. Most of the services that have been offered are for a mobile vehicle in operation, wherein an occupant of the vehicle seeks to utilize the communication service.

Access to specific features of on-vehicle wireless communication devices, e.g., navigation and other complex infotainment/telematics features, may be disabled during specific vehicle operations because of potential for vehicle driver distraction. These features are disabled for the driver and, consequently, are also disabled for a passenger. Alternatively, or in addition, some features have redundant controls for separate interactions by the driver or any passengers. Disabling access to specific features and providing redundant controls reduces the usefulness, utilization, and therefore the attractiveness of such devices in a vehicle. Climate/HVAC controls can include multiple climate control panels to permit localized control of temperature to each occupant. Adding additional control panels in the vehicle increases cost and complexity in the vehicle, including costs for the control devices and wiring harnesses, reducing availability of the feature.

Therefore there is a need for an in-vehicle control panel system which addresses the aforementioned issues.

SUMMARY

An apparatus for operator control of an in-vehicle system includes an interface device for receiving inputs for control of the in-vehicle system from the operator. A sensing system is operative to determine a location of the operator providing the inputs to the interface device. And, a controller is operative to adapt the control of the in-vehicle system based upon the location of the operator providing the inputs.

BRIEF DESCRIPTION OF THE DRAWINGS

Referring now to the figures, which are exemplary embodiments and wherein the like elements are numbered alike.

DETAILED DESCRIPTION OF THE INVENTION

Figure 1:
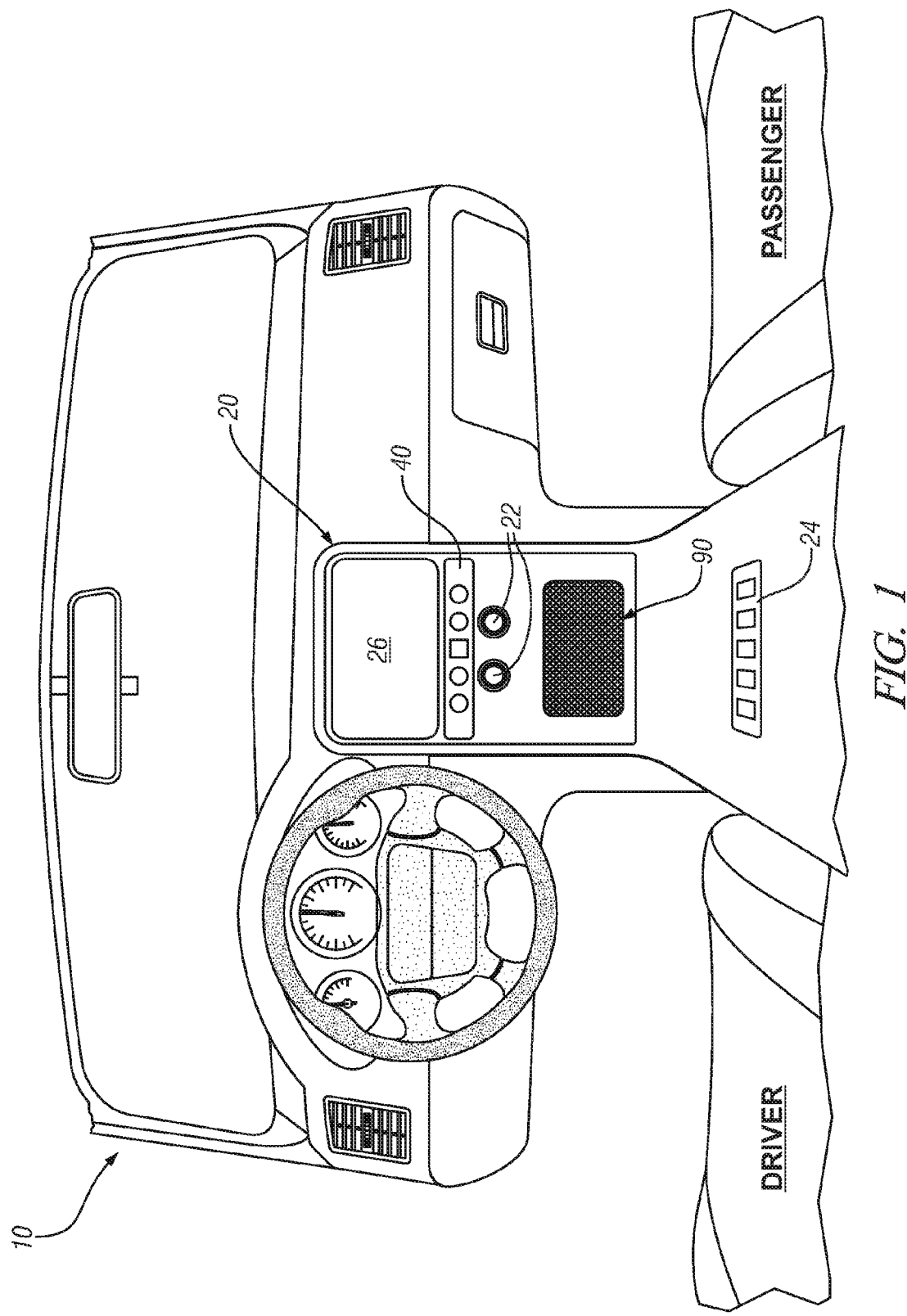
FIG. 1 is a schematic diagram of a system, in accordance with an embodiment the present invention.
Figure 3:
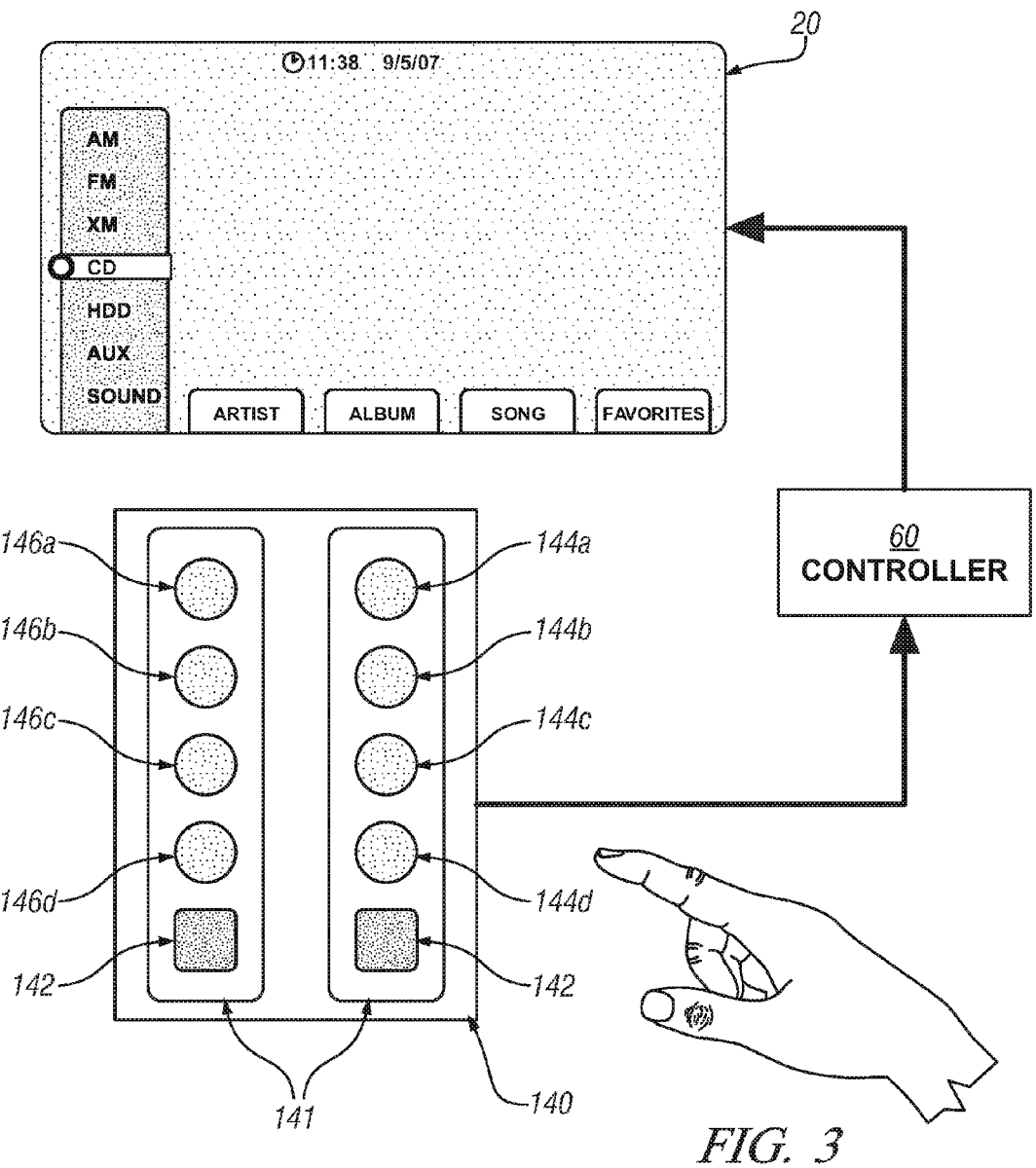

Referring now to the drawings, wherein the depictions are for the purpose of illustrating embodiments of the invention only and not for the purpose of limiting the same, FIG. 1 is a schematic depiction of a passenger compartment of a vehicle 10 and system that has been constructed in accordance with an embodiment of the present invention. The system in this disclosure provides selective controllability of an in-vehicle system, based upon a location of an operator seeking to control the system. There is an interface device 20 which is operable to receive control inputs from an operator, i.e., individuals in two or more distinct locations. The locations can be, e.g., in front seats of a motor vehicle, or in a cockpit. There is a location sensing system 40 operative to determine the distinct location of the operator providing the inputs to the interface device 20, e.g., one of a driver and a passenger when the invention is applied to a motor vehicle. There is a controller 60 (depicted with reference to FIGS. 3 and 4), operative to receive input signals from the location sensing system 40 and adapt control of the in-vehicle system based upon the distinct location of the operator providing the input. The interface device 20 is preferably operative to provide visual feedback to the operator, including identifying the specific interface device receiving a control input, and the specific setting for the interface device by which the in-vehicle system is controlled. There is preferably an audio-speaker system 90 controlled by the controller 60 and operative to provide audio feedback to the operator, including identify the specific element of the interface device receiving the control input, and the specific setting for the element of the interface device by which the in-vehicle system is controlled. This is now described in detail.

The operator is the person seeking to provide control input to the interface device 20 to control the in-vehicle system. The operator may be one of the driver of the vehicle and the passenger placed in the front seat of the vehicle in the embodiments described herein. The interface device 20 which receives control inputs from either of the operators includes a control panel comprising a plurality of elements. The elements comprise a visual display screen 26 that may be touch-activated, buttons 24, switches, and knobs 22 that are operator selectable or operator-adjustable. The interface device 20 is preferably located in a console between the driver and passenger in the front seating area of the vehicle. The elements of the control panel send signals for controlling various features of the in-vehicle system, either directly or via controller 60. The interface device including the control panel is preferably readily viewable and accessible by both the driver and the passenger. The in-vehicle system being controlled may include such non-limiting examples as an on-board navigation system, a climate control/HVAC system, an entertainment and information system, and, a wireless communications system.

Figure 2:
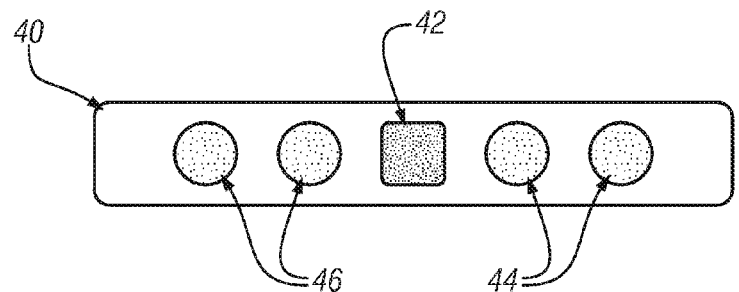
FIG. 2 is a schematic diagram of an element of the system, in accordance with an embodiment of the present invention; and, FIGS. 3 and 4 are schematic diagrams of embodiments of the system, in accordance with an embodiment of the present invention.

Referring now to FIG. 2, there is depicted an embodiment of the location sensing system 40. The location sensing system 40 is placed adjacent to the interface device 20 and is signally connected to the controller 60. The location sensing system 40 is operative to identify a location of the operator, and identify the person seeking access to and thus provide input to the control panel of the interface device 20 as one of the vehicle driver and the passenger. The location sensing system 40 preferably comprises an optical proximity sensor comprising an optical sensing device having short-range directional sensing capability. In the embodiment depicted, the optical proximity sensor consists of a single short-range infrared ('IR') LED device 42 which emits a low power infrared light beam during operation of the vehicle. There are light receivers 44, 46 which comprise known devices operative to sense IR light reflected from the LED device 42. As depicted, there are two light receivers 44 on the right side of the LED device 42 adapted to detect IR light reflected from a hand or finger of the passenger, and exclude IR light reflected from a hand of the driver. There are two light receivers 46 on the left side of the LED device 42 adapted to detect IR light reflected from a hand or finger of the driver, and exclude IR light reflected from a hand of the passenger. Thus, the light emitted from the infrared light source detected by the light receivers 44 on the right side of the LED device 42 may be mutually exclusive from the light emitted from the infrared light source detected by the light receivers 46 on the left side of the LED device 42. Excluding IR light reflected from either the driver or the passenger is preferably accomplished by selective placement, physical orientation, and shielding of the specific light receivers 44, 46. Under normal operation, when neither the driver nor the passenger seeks to control features of the in-vehicle system, there is minimal reflected light to receivers 44 and 46, and the output of the location sensing system 40 is neutral. When the driver seeks to control features of the in-vehicle system by placing a hand near the interface device 20, the output of the location sensing system 40 so indicates, via signals from receivers 46 transmitted to the controller 60. Similarly, when the passenger seeks to control features of the in-vehicle system by placing a hand near the interface device 20, the output of the location sensing system 40 so indicates via signals from receivers 44 transmitted to the controller 60. The output of the location sensing system is continually and ongoing communicated to the controller 60. The location sensing system 40 is depicted as a device with sensors and LED laid out in a single horizontal line, but the light receivers 44, 46 can be placed in various configurations for effective detection of the operator, including a vertical configuration, or a conical configuration, to prevent a misperception of an operator. Alternatively, the location sensing system 40 comprises a single LED device 42 and one or more receivers 44, and is positioned to detect only the passenger. Alternatively, the location sensing system 40 comprises a single LED device 42 and one or more receivers 46 and is positioned to detect only the driver. Alternatively, the sensor may comprise a thermal sensing device, or other sensing technologies suitable for identifying location of the operator that operates as disclosed herein.

In a first embodiment, the in-vehicle system comprises an on-board navigation system. For safety reasons, the controller 60 may act to prevent the driver from interfacing with the navigation system when the vehicle is operating, i.e., in gear. However, the interface device 20 is constantly active and accessible to the passenger. When the location sensing system 40 determines that the driver is attempting to access the interface device 20, it communicates the information to the controller 60, which locks the interface device 20, preventing input from the driver until such operating conditions occurring for the controller 60 to permit access by the driver, e.g., when the vehicle transmission is in 'park'.

In a second embodiment, the in-vehicle system comprises the on-board navigation system. The interface device 20 is constantly locked and inaccessible to the driver. When the location sensing system 40 determines that the passenger is attempting to access the interface device 20, it communicates the information to the controller 60, which unlocks the interface device 20, permitting access and input from the passenger.

In a third embodiment, the in-vehicle system comprises a climate control/HVAC system operative to provide climate control in the vehicle passenger compartment that is location-specific. Such systems consist of providing individual temperature control and fan speed control to the driver and the passenger. The interface device 20 is preferably constantly active and accessible to the passenger and the driver during vehicle operation. The location sensing system 40 determines which of the driver and the passenger is accessing the interface device 20, and communicates the appropriate information to the controller 60. The controller monitors inputs to the interface device 20, and adjusts the controls to the climate control/HVAC system based upon whether the operator input is from the driver or the passenger. The climate control/HVAC system is controlled by a single interface device, preferably consisting of a single set of operator-adjustable knobs adapted to control temperature and blower fan settings. The single interface device is operative to effect control of the climate control/HVAC system specific to the driver, specific to the passenger, and, vehicle-wide. Thus, the passenger can use the single interface device to control climate in their zone of the passenger compartment, and the driver can use the single interface device to control climate in their zone of the passenger compartment, and both the driver and the passenger can use the single interface device to control climate in the entire passenger compartment, if so desired. Alternate access and lockout functionality may be implement also. By way of example, it may be desirable that the driver be provided full authority over the system being controlled whereas the passenger is provided limited authority. In the exemplary climate control/HVAC system, this may be implemented by the passenger with climate control/HVAC authority for the passenger's zone only without any authority over the driver's zone settings or the vehicle wide settings. The driver, on the other hand, may be provided complete authority over driver zone, passenger zone and vehicle wide settings. The controller may be adapted to transmit an audio signal to the passenger compartment of the vehicle indicating the specific control feature being adjusted (e.g., "temperature", or "fan setting"), and the setting of the control feature (e.g., "21° C.", or "medium-low").

In a fourth embodiment, the in-vehicle system consists of one of a navigation system, a climate control system, an entertainment system, and a wireless communications system. As depicted with reference to FIG. 3, the system comprises an entertainment system. The location sensing system 40 functions as the proximity sensor previously described, to identify the location of the operator, i.e., the passenger or the driver. Furthermore, the location sensing system 40 is adapted to provide a portion of the interface functions. In this embodiment, the interface device 20 is preferably a visual touch-activated screen, or alternatively, the visual screen and a plurality of operator-adjustable knobs and buttons. The location sensing system 140 comprises a pair of optical proximity sensors 141. The optical proximity sensors 141 are each placed in a substantially vertical orientation and substantially parallel to each other, although the orientation of the sensors is pertinent only in relationship to the ability of the sensors to discern and differentiate between the driver and the passenger, to permit ready access by the respective one of the driver and the passenger, and to prevent interaction therebetween. Thus, the optical proximity sensors 141 may be placed substantially parallel to a longitudinal axis of the vehicle, with the orientation of each sensor tilting away from each other and away from a z-axis (i.e. vertical) orientation of the vehicle. Each of the optical proximity sensors 141 consists of a single short-range infrared ('IR') LED device 142 which emits infrared light during operation of the vehicle. There is a plurality of light receivers (144-passenger, 146-driver) which comprise known devices operative to sense reflected IR light from the LED device 142. The individual light receivers 144(*a*)-144(*d*) and 146(*a*)-146(*d*) are preferably aligned linearly. The individual light receivers 144(*a*)-144(*d*) and 146(*a*)-146(*d*) are signally individually connected to the controller such that the controller is able to discern therebetween. Thus the controller can interpret an input comprising IR light reflected to any one of, or a plurality of the individual light receivers. In operation, when an operator seeks to adjust one of the systems, e.g., the entertainment system depicted with reference to FIG. 3, their hand approaches the location sensing system 140, thus activating operation of the system. The controller 60 determines the operator to be either the passenger or the driver, and generates a user-specific menu on the touch-activated screen of the interface device 20. The operator moves their hand or a finger along the optical proximity sensor 141, sending signals from the individual light receivers which are read and interpreted by the controller 60, which acts to scroll along the user-specific menu on the touch-activated screen of the interface device 20. The operator uses their finger along the proximity sensor to select from the menu, as read by the controller. The controller then activates the selected system. There may be additional inputs to control the operation of the selected system via the touch-activated screen of the interface device 20. In the system depicted in FIG. 3, the menu includes various radio frequencies or bands (AM, FM, XM) and other devices or sources (CD, HDD, AUX, and SOUND). The individual preferences for the passenger and the driver are preferably preset using conventional mechanisms.

Figure 4:
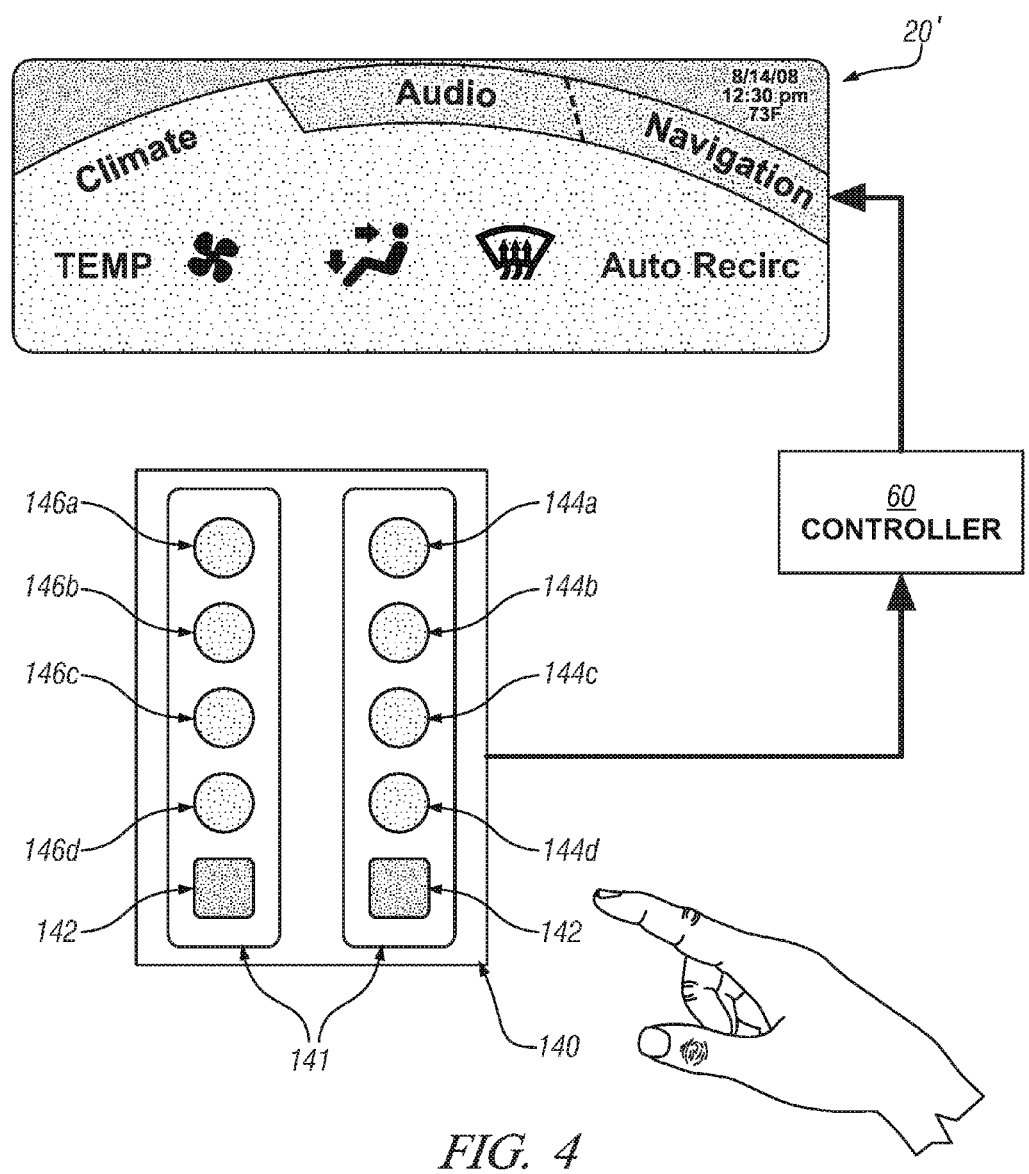

Referring now to FIG. 4, a fifth embodiment is depicted, comprising a multi-function system, including interface device 20'. In this embodiment, the location sensing device 140 is as previously depicted with reference to FIG. 3. The interface device 20' provides access to multiple in-vehicle systems, depicted as climate control, audio control, and navigation. The operator is able to select one of the systems using the location sensing device 140, typically by holding their finger in a fixed location for a predetermined period of time, e.g., two seconds. Again, the controller 60 is able to detect whether the operator is the driver or the passenger, and prevent the driver from having access to the navigation system unless specific operating conditions are met. Once a specific system has been selected, depicted herein as climate control, a second menu appears on the interface device screen, comprising a series of functions specific to the system. The operator can select one of the functions, and adjust the setting. The in-vehicle system is controlled in conjunction with conventional inputs (knobs) of the interfaces, or stand-alone. The interface device 20' which receives control inputs from the operators is a control panel consisting of other control devices, e.g., a plurality of buttons, switches, and knobs. The interface device 20' is preferably located in a console between the driver and passenger in the front seat of the vehicle. The control devices of the control panel are operative to control various features of the in-vehicle system. The interface device including the control panel is preferably readily viewable and accessible by both the driver and the passenger.

The system described herein uses an optical-based sensing system to identify and locate operators of the system and provide system access that is differentiated based upon the location of the operator. When the vehicle is operational, and a person seeks to interact with the control panel, output from the sensor is fed into a control algorithm which is preferably resident in the control panel. When the sensor discerns the person seeking to interact with the control is on the left-side of the vehicle, indicating the vehicle operator, the control algorithm continues to limit access, thus permitting the operator access only to those features allowable during vehicle operation. When the sensor discerns the person seeking to interact with the control is on the right-side of the vehicle, indicating the passenger, the control algorithm selectively activates the control panel, thus permitting the passenger access to most or all features on the control panel during vehicle operation. When the sensor discerns that both the operator and the passenger are seeking access to the control panel, the control algorithm can act to limit access, thus continuing to limit the operator access only to those features allowable during vehicle operation. When the passenger discontinues the interaction by removing their hand, discernible by the sensor, the control algorithm selectively deactivates the control panel to its original state, again permitting the operator access only to those features allowable during vehicle operation.

It is understood that modifications are allowable without departing from the scope of the disclosure. It is further understood that applications of the system reach beyond the automobile, to any vehicles, such as aviation applications, wherein there is a pilot and a co-pilot. The disclosure describes certain embodiments and modifications thereto. Further modifications and alterations may occur to others upon reading and understanding the disclosure. The disclosure is intended to include all such modifications and alterations insofar as they come within the scope of the appended claims.

Having thus described the invention, it is claimed:

1. Apparatus for operator control of an in-vehicle system, comprising:

an interface device for receiving inputs for control of the in-vehicle system from an operator hand, said interface device comprising a control panel including a visual display screen;

a sensing system adjacent the interface device comprising a first optical proximity sensor including a first infrared light source and a first plurality of directionally sensitive light receivers for detecting a first reflected infrared light from the first infrared light source that is reflected by the operator hand only when the operator hand approaches the first optical proximity sensor near the interface device from a driver side of the vehicle, and a second optical proximity sensor including a second infrared light source and a second plurality of directionally sensitive light receivers for detecting a second reflected infrared light from the second infrared light source that is reflected by the operator hand only when the hand approaches the second optical proximity sensor near the interface device from a passenger side of the vehicle; and a controller generating a user-specific menu on the visual display screen based upon the first and second plurality of directionally sensitive light receivers detecting respective first and second reflected infrared light from the respective first and second infrared light sources.

2. The apparatus of claim 1, wherein the in-vehicle system comprises a navigation system, and the controller is operative to disable control of the navigation system when the first plurality of directionally sensitive light receivers detects the first reflected infrared light.

3. The apparatus of claim 1, wherein the in-vehicle system comprises a navigation system, and the controller is operative to enable control of the navigation system when the second plurality of directionally sensitive light receivers detects the second reflected infrared light.

4. The apparatus of claim 1, wherein:
the in-vehicle system comprises a location-specific climate control system;
the interface device for receiving inputs for control of the climate control system from the operator hand consists of a single interface device; and
the controller is operative to provide location-specific climate control for the operator to one of the passenger side of the vehicle and the driver side of the vehicle based upon the one of the first and second plurality of directionally sensitive light receivers detecting respective first and second reflected infrared light from the light source.

5. The apparatus of claim 1, wherein:
the in-vehicle system comprises an entertainment system;
the interface device for receiving inputs for control of the entertainment system from the operator hand consists of a single interface device; and
the controller is operative to provide operator-specific entertainment control based upon the one of the first and second plurality of directionally sensitive light receivers detecting respective first and second reflected infrared light from the light source.

6. The apparatus of claim 1, further comprising an audio-speaker system controlled by the controller operative to provide audio feedback to the operator comprising the specific interface device receiving the control input and the specific setting for the interface device.

7. The apparatus of claim 1, wherein the interface device for receiving inputs for control of the in-vehicle system from the operator comprises one or more of visual display screen devices, operator-adjustable knobs, and operator-selectable buttons.

* * * * *